(12) United States Patent
Gooding et al.

(10) Patent No.: US 10,115,196 B2
(45) Date of Patent: Oct. 30, 2018

(54) METHOD AND APPARATUS FOR DELINEATING AN OBJECT WITHIN A VOLUMETRIC MEDICAL IMAGE

(71) Applicant: Mirada Medical Limited, Oxford (GB)

(72) Inventors: Mark Gooding, Oxford (GB); Timor Kadir, Oxford (GB); Aymeric Larrue, Surrey (GB)

(73) Assignee: Mirada Medical Limited, Oxford (GB)

( * ) Notice: Subject to any disclaimer, the term of this patent is extended or adjusted under 35 U.S.C. 154(b) by 0 days.

(21) Appl. No.: 15/500,200

(22) PCT Filed: Jul. 28, 2015

(86) PCT No.: PCT/EP2015/067244
§ 371 (c)(1),
(2) Date: Jan. 30, 2017

(87) PCT Pub. No.: WO2016/016227
PCT Pub. Date: Feb. 4, 2016

(65) Prior Publication Data
US 2017/0262983 A1 Sep. 14, 2017

(30) Foreign Application Priority Data
Aug. 1, 2014 (GB) .................................. 1413721.0

(51) Int. Cl.
*G06K 9/00* (2006.01)
*G06T 7/00* (2017.01)
(Continued)

(52) U.S. Cl.
CPC .............. *G06T 7/0012* (2013.01); *G06T 7/12* (2017.01); *G06T 7/60* (2013.01);
(Continued)

(58) Field of Classification Search
CPC ......... G06T 7/0012; G06T 2207/20128; G06T 7/60; G06T 7/12
(Continued)

(56) References Cited

U.S. PATENT DOCUMENTS 6,424,732 B1 7/2002 Shiffman et al.
9,495,756 B2 * 11/2016 Rivet-Sabourin ..... G06T 3/4053
(Continued)

OTHER PUBLICATIONS

Hp et al: "Salient features useful for the accurate segmentation of masticatory muscles from minimum slices subsets of magnetic resonance images", Machine Vision and Applications, Springer, Berlin, DE, vol. 21, 10. 4, Oct. 14, 2008 (Oct. 14, 2008), pp. 44967, XP019836912JSSN: 1432-1769abstractp. 450-p. 452; Figure 1.*
(Continued)

*Primary Examiner* — Gregory F Cunningham
(74) *Attorney, Agent, or Firm* — Optimus Patents US, LLC

(57) ABSTRACT

A method and apparatus for delineating an object within a volumetric medical image. The method comprises obtaining auto-generated contour data for the object within the volumetric medical image, the auto-generated contour data defining a set of auto-generated contours forming a delineation structure for the object, selecting a subset of auto-generated contours for manual editing, and identifying the selected subset of auto-generated contours to a user. In some examples, the method further comprises presenting at least the selected subset of auto-generated contours to the user, receiving user feedback for at least one auto-generated contour, deriving a full set of contours forming a revised delineation structure for the object based at least partly on an interpolation of the auto-generated contour(s) for which user feedback was received, and storing contour data defining the derived full set of contours forming the revised delineation
(Continued)

structure for the object within at least one data storage device.

19 Claims, 8 Drawing Sheets

(51) Int. Cl.
 *G06T 7/12* (2017.01)
 *G06T 7/60* (2017.01)
(52) U.S. Cl.
 CPC ........... *G06T 2207/20096* (2013.01); *G06T 2207/20104* (2013.01); *G06T 2207/20108* (2013.01); *G06T 2207/20128* (2013.01); *G06T 2207/30004* (2013.01)
(58) Field of Classification Search
 USPC .......................................................... 382/128
 See application file for complete search history.

(56) References Cited

U.S. PATENT DOCUMENTS

| 9,767,569 | B2* | 9/2017 | Jo | G06T 7/11 |
| 9,992,554 | B2* | 6/2018 | Cai | H04N 21/23418 |
| 10,013,810 | B2* | 7/2018 | Waschbusch | G06T 19/20 |
| 2001/0033283 | A1 | 10/2001 | Liang et al. | |
| 2006/0170679 | A1 | 8/2006 | Wang et al. | |
| 2009/0060299 | A1 | 3/2009 | Hibbard et al. | |
| 2011/0271215 | A1 | 11/2011 | Piper | |
| 2013/0033419 | A1* | 2/2013 | Dror | G06T 7/12 345/156 |

OTHER PUBLICATIONS

H.P. Ng et al: "Salient features useful for the accurate segmentation of masticatory muscles from minimum slices subsets of magnetic resonance images", Machine Vision and Applications, Springer, Berlin, DE, vol. 21, 10. 4, Oct. 14, 2008 (Oct. 14, 2008), pp. 449A67, XP019836912JSSN: 1432-1769abstractp. 450-p. 452; Figure 1.*

Ng Hp et al: "Salient features useful for the accurate segmentation of masticatory muscles from minimum slices subsets of magnetic resonance images", Machine Vision and Applications, Springer, Berlin, DE, vol. 21, No. 4, Oct. 14, 2008 (Oct. 14, 2008), pp. 449-467, XP019836912,ISSN: 1432-1769abstractp. 450-p. 452; figure 1.

Liu J et al: Three dimensional digital atlas of the orbit constructed from multi-modal radiological images, International Journal of Computer Assisted Radiology and Surgery, Springer, DE, vol. 1, Jan. 1, 2007 (Jan. 1, 2007), pp. 275-283, XP002544379, ISSN: 1861-6410, DOI: 101007/S11548-006-0063-3 [retrieved on Jan. 25, 2007] p. 2.

* cited by examiner

METHOD AND APPARATUS FOR DELINEATING AN OBJECT WITHIN A VOLUMETRIC MEDICAL IMAGE

FIELD OF THE INVENTION

This invention relates to a method and apparatus for delineating an object within a volumetric medical image.

BACKGROUND OF THE INVENTION

In the field of radiotherapy treatment, it is often necessary for medical staff, typically a radiation oncologist, to delineate a target volume and tumour within a medical image of a patient for radiotherapy planning. This image is normally a computed tomography (CT) scan, although it may be another imaging modality. It is also necessary for the medical staff, for example a dosimetrist or radiographer, to delineate all normal organs within the medical image, considered organs at risk on the planning image. This is done so that the planning software, which (semi-)automatically calculates a treatment plan, is able to maximise the plan radiotherapy dose to the target volume and tumour, while minimising radiation dose to healthy organs.

The process of delineation is known as contouring. Typically two dimensional (2D) contours are drawn on cross-sectional image slices, although the planning medical image is typically a three dimensional (3D) volumetric image. Therefore the delineation of, say, an organ would consist of a stack of 2D contours, representing a volumetric outline. Contouring can also be performed in 3D using some systems. Since contouring can be both 2D and 3D, the term structure is often used to represent the delineation on the image, whether 2D or 3D. Where the term contour is used, this indicates a single 2D delineation only. For clarity, the term contouring as used herein may indicate the process of delineation in either 2D or 3D to form a structure. Furthermore, the term auto-generated contouring is used herein to indicate a contour or structure produced automatically (as opposed to manually), with the term auto-generated contour or auto-structure referring to such an automatically produced contour/structure.

Manual contouring, as generally performed for radiotherapy contouring is time consuming, and is a significant bottleneck in the treatment planning process, particularly for advanced treatments needing detailed contouring. Therefore, systems have been developed for generating contours, known as auto-generated contouring. Auto-generated contouring can be performed in a number of different ways, for example through the use of previous example cases known as atlases, or through model-based segmentation approaches. However, no current auto-generated contouring systems are perfect, automatically generated contours typically require manual editing to ensure that they delineate the target volume (e.g. organ or tumour) with sufficient accuracy.

To manually contour a spinal cord (without any assistance from an auto-generated contouring system) a radiographer might typically contour, say, every 3rd slice of a CT image and then use contour interpolation to 'fill in the gaps' for the remaining slices of the image.

Conversely, when presented with auto-generated contours for all slices of the CT images, the radiographer will have to edit each incorrect slice. Consequently, although time is saved by having an initial set of auto-generated contours for all slices, additional time is spent having to subsequent edit (or at least approve) every slice. Therefore, although auto-generated contouring solutions may reduce the time taken compared to fully manual contouring, they still do not significantly reduce the overall time taken for radiotherapy contouring, and they still require some manual contouring or editing. As such, even with the aid of current auto-generated contouring systems, radiotherapy contouring remains a bottleneck in clinical practice.

Thus, there is a need for a more efficient and less time-consuming approach to radiotherapy contouring.

SUMMARY OF THE INVENTION

Accordingly, the invention seeks to mitigate, alleviate or eliminate one or more of the abovementioned disadvantages singly or in any combination.

According to some examples of a first aspect of the present invention, there is provided a method of delineating at least one object within a volumetric medical image. The method comprises obtaining auto-generated contour data for the at least one object within the volumetric medical image, the auto-generated contour data defining a set of auto-generated contours forming at least one delineation structure for the at least one object, selecting a subset of auto-generated contours for manual editing, and identifying the selected subset of auto-generated contours to a user.

In this manner, the user is able to manually edit the identified subset of auto-generated contours, and to then use contour interpolation to 'fill in the gaps' between the (edited) contours within the determined subset. As such, the number of image slices for which contour editing is performed may be significantly reduced (e.g. from every slice intersecting the object of interest to only those corresponding to the determined subset of auto-generated contours), thereby enabling a more efficient and less time-consuming approach to radiotherapy contouring.

According to some optional examples of the present invention, the method may further comprise presenting at least the selected subset of auto-generated contours to the user, receiving user feedback for at least one auto-generated contour, deriving a full set of contours forming at least one revised delineation structure for the at least one object based at least partly on an interpolation of the at least one auto-generated contour for which user feedback was received, and storing contour data defining the derived full set of contours forming at least one revised delineation structure for the at least one object within at least one data storage device.

According to some optional examples of the present invention, the method may comprise receiving user feedback for a plurality of auto-generated contours, and deriving a full set of auto-generated contours forming at least one revised delineation structure for the at least one object based at least partly on an interpolation of the plurality of auto-generated contours for which user feedback was received.

According to some optional examples of the present invention, the method may further comprise receiving at least one indication from the user of at least one contour to be edited, and receiving user feedback for the at least one contour to be edited.

According to some optional examples of the present invention, the method may comprise the at least one indication received from the user of at least one contour to be edited comprises at least one from a group of:
 an indication of an image slice of the medical image; and
 an indication of an object within the medical image.

According to some optional examples of the present invention, the method may further comprise receiving user feedback for at least one auto-generated contour comprising one from a group of:
- approval of the at least one auto-generated contour;
- modification of the at least one auto-generated contour; and
- replacement of the at least one auto-generated contour with a user generated contour.

According to some optional examples of the present invention, the method may further comprise indicating to the user for which of the auto-generated contours user feedback has been received.

According to some optional examples of the present invention, the method may comprise presenting the obtained set of auto-generated contours forming a delineation structure to the user, and identifying to the user image slices of the volumetric medical image comprising auto-generated contours within the at least subset of auto-generated contours selected for manual editing.

According to some optional examples of the present invention, identifying the selected subset of auto-generated contours to a user may comprise storing in a data storage device auto-generated contour data defining the selected subset of auto-generated contours.

According to some optional examples of the present invention, the method may comprise decimating the obtained set of auto-generated contours to derive the subset of auto-generated contours for manual editing.

According to some optional examples of the present invention, the method may comprise selecting the subset of auto-generated contours for manual editing based at least partly on at least one from a group of:
- a user-configurable spacing between image slices corresponding to the derived subset of auto-generated contours;
- a predefined spacing between image slices corresponding to the derived subset of auto-generated contours;
- an assessment of out-of-plane curvature of auto-generated contours;
- differences between contours corresponding to neighbouring image slices;
- prior definition on a model or atlas;
- learning based on previous editing; and
- assessment of estimated contour accuracy.

According to some optional examples of the present invention, the method may comprise generating the auto-generated contour data defining the set of auto-generated contours forming at least one delineation structure for the at least one object based at least partly on at least one from a group of:
- an atlas-based auto-generated contouring process;
- a segmentation-based auto-generated contouring process; and
- a model-based auto-generated contouring process.

According to some optional examples of the present invention, the method may comprise loading the auto-generated contour data defining the set of auto-generated contours forming at least one delineation structure for the at least one object from a data storage device.

According to some examples of a second aspect of the present invention, there is provided a method of delineating at least one object within a volumetric medical image. The method comprises loading auto-generated contour data defining a pre-decimated subset of auto-generated contours pre-selected for manual editing, presenting at least the pre-decimated subset of auto-generated contours to a user, receiving user feedback for at least one auto-generated contour; deriving a full set of contours forming at least one revised delineation structure for the at least one object based at least partly on an interpolation of the at least one auto-generated contour for which user feedback was received, and storing contour data defining the derived full set of contours forming at least one revised delineation structure for the at least one object within at least one data storage device.

According to some optional examples of the present invention, the method may further comprise receiving at least one indication from the user of at least one contour to be edited, and receiving user feedback for the at least one contour to be edited.

According to some optional examples of the present invention, the method may comprise the at least one indication received from the user of at least one contour to be edited comprises at least one from a group of:
- an indication of an image slice of the medical image; and
- an indication of an object within the medical image.

According to some optional examples of the present invention, the method may comprise receiving user feedback for at least one auto-generated contour comprising one from a group of:
- approval of the at least one auto-generated contour;
- modification of the at least one auto-generated contour; and
- replacement of the at least one auto-generated contour with a user generated contour.

According to some optional examples of the present invention, the method may further comprise indicating to the user for which of the auto-generated contours user feedback has been received.

According to some optional examples of the present invention, the method may comprise indicating to the user image slices of the volumetric medical image comprising auto-generated contours within the pre-decimated subset of auto-generated contours pre-selected for manual editing.

According to some examples of a third aspect of the present invention, there is provided a non-transitory computer program product having executable program code stored therein for delineating at least one object within a volumetric medical image; the program code operable for performing the method of the first and/or second aspect of the present invention.

According to some optional examples of the present invention, the non-transitory computer program product may comprise at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

According to some examples of a fourth aspect of the present invention, there is provided a medical image delineation system comprising at least one signal processor component. The at least one signal processor component is arranged to obtain auto-generated contour data for the at least one object within the volumetric medical image, the auto-generated contour data defining a set of auto-generated contours forming at least one delineation structure for the at least one object, select a subset of auto-generated contours for manual editing, and identify the selected subset of auto-generated contours to a user.

According to some optional examples of the present invention, the medical image delineation system may further comprise at least one display component and at least one input component; wherein the at least one signal processor component is further arranged to cause the at least one display component to present at least the selected subset of auto-generated contours to the user, receive from the at least one input component user feedback for at least one auto-generated contour, derive a full set of contours forming at least one revised delineation structure for the at least one object based at least partly on an interpolation of the at least one auto-generated contour for which user feedback was received, and store contour data defining the derived full set of contours forming at least one revised delineation structure for the at least one object within at least one data storage device.

According to some optional examples of the present invention, the at least one signal processor component may be arranged to identify the selected subset of auto-generated contours to a user by storing in a data storage device auto-generated contour data defining the selected subset of auto-generated contours.

According to some examples of a fifth aspect of the present invention, there is provided a medical image delineation system comprising at least one signal processor component, at least one display component and at least one input component. The at least one signal processor component is arranged to load auto-generated contour data defining a pre-decimated subset of auto-generated contours pre-selected for manual editing, cause the at least one display component to present at least the pre-decimated subset of auto-generated contours to a user, receive from the at least one input component user feedback for at least one auto-generated contour, derive a full set of contours forming at least one revised delineation structure for the at least one object based at least partly on an interpolation of the at least one auto-generated contour for which user feedback was received, and store contour data defining the derived full set of contours forming at least one revised delineation structure for the at least one object within at least one data storage device.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
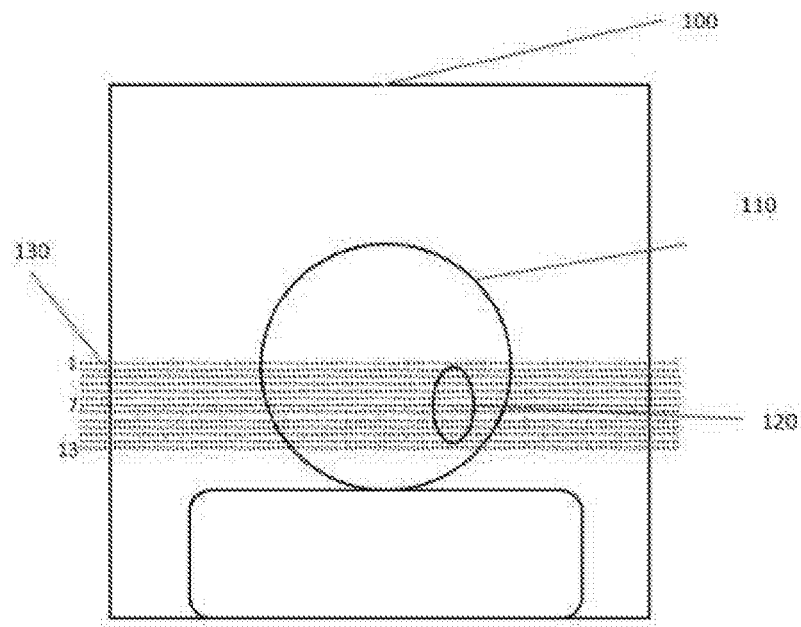
FIG. 1 illustrates a simplified example of a coronal view of a patient CT scan image.

An example of the present invention will now be described with reference to the accompanying drawings. However, it will be appreciated that the present invention is not limited to the specific embodiment(s) herein described and illustrated in the accompanying drawings.

Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

Unless otherwise stated for specific instances, the term image used hereinafter refers to a volumetric (3D) image. Such a volumetric image may be obtained via any suitable imaging modality such as, by way of example only, CT (computed tomography), PET (positron emission tomography), and MRI (magnetic resonance imaging) imaging modalities, and typically comprises a plurality of stacked (2D) image slices.

As explained in the background of the invention, it is often necessary for a clinical expert to delineate (outline) structures within a volumetric image (typically a CT scan) to aid in radiotherapy planning. This is a time consuming process, and may take several hours in the case of head and neck cancer. Therefore, to improve efficiency within clinical radiotherapy contouring, several approaches have been developed that enable initial contours to be generated automatically. These methods are known generically as auto-generated contouring, although the underlying technology approach may differ between systems.

Three main approaches (and combinations thereof) have been developed. These three main approaches are atlas-based, segmentation-based and model-based approaches for auto-generated contouring.

In atlas-based auto-generated contouring, the organs within one or more example medical images, normally CT images, are carefully delineated by a clinical expert. This combination of a medical image and delineated structures is known as an atlas. When a new patient image is to be contoured, the atlas image(s) is/are aligned to the patient image using deformable image registration. The delineated structures are then mapped from the atlas to the patient image using the same deformation field. Where multiple atlases have been used, multiple structures for each organ may exist on the patient image. These would be merged into a consensus structure. The resulting structure is represented as contours on each slice of the patient image. Examples of such atlas-based auto-generated contouring are described in greater detail within the following publications, which are incorporated herein by reference:

"Atlas-Based Auto-segmentation of Head and Neck CT Images" MICCAI 2008. Springer-Verlag Berlin Heidelberg, 2008. 434-441. Han, Xiao, et al.

"Multi-atlas Based Segmentation: Application to the Head and Neck Region for Radiotherapy Planning" MICCAI Workshop Medical Image Analysis for the Clinic—A Grand Challenge. 2010. Ramus, Liliane, and Malandain, Grégoire In segmentation-based auto-generated contouring, an automated or semi-automated method is developed to identify the different objects within an image. Such segmentation-based approaches attempt to encode expert knowledge regarding intensity, texture, and position information about an image in an algorithm to describe how to derive the correct delineation. There are many variations on such algorithms, examples of which are described in greater detail within the following publications, which are incorporated herein by reference:

"Automatic segmentation of thoracic and pelvic CT images for radiotherapy planning using implicit anatomic knowledge and organ-specific segmentation strategies" Physics in medicine and biology 53.6 (2008): 1751-71. Haas, Benjamin, et al.

"Interactive region and volume growing for segmenting volumes in MR and CT images" Informatics for Health and Social Care 19.1 (1994): 71-80. Sivewright, G. J., and P. J. Elliott.

In model-based auto-generated contouring a model of an organ shape and position, or relative position to other organs, may be provided to aid in the auto-generated contouring process. Such model-based auto-generated contouring can be considered a variation of segmentation-based auto-generated contouring, incorporating some of the knowledge encapsulated in atlas-based contouring, but not requiring previous cases to be stored, or deformable registration to be perform. Examples of such model-based auto-generated contouring are described in greater detail within the following publications, which are incorporated herein by reference:

Pekar, Vladimir, Todd R. McNutt, and Michael R. Kaus. "Automated model-based organ delineation for radiotherapy planning in prostatic region." International Journal of Radiation Oncology* Biology* Physics 60.3 (2004): 973-980.

Costa, María Jimena, et al. "Automatic segmentation of bladder and prostate using coupled 3D deformable models." Medical Image Computing and Computer-Assisted Intervention—MICCAI 2007. Springer Berlin Heidelberg, 2007. 252-260.

Such approaches to auto-generated contouring are never sufficiently accurate, and although such approaches have been shown to save time in generating initial contours, the resulting contours require editing. As such, despite this apparent time saving, in clinical practice the use of such auto-generated contouring is often found not to result in overall time savings due to the need for time consuming editing.

The inventors have identified that a significant contributing factor to the amount of time required for editing auto-generated contours is that having auto-generated contours present on image slices changes the clinical workflow. Typically when contouring manually, contours may be drawn slice by slice through an image. However, where the clinician has knowledge that the structure varies little between slices, they may opt to contour every other slice, or fewer. Having contoured a number of slices for an organ, interpolation tools may then be used to fill in the gaps. Note interpolation may be implemented in many different ways as would be known to those skilled in the art, from simple contour-based interpolation to more complex approaches considering the underlying image information. In most cases the resulting contours on the intermediate slices will require no editing. However, when presented with an auto-generated contour for every slice, the clinical workflow will change and the clinician will check the contour on every slice and will edit the contour manually on most of them, or manually delete them if they are consider too inaccurate and then manually contour that slice again. Consequently, the clinician may spend more time editing the auto-generated contours than they would if drawing the contours without initial auto-generated contours.

FIG. 1 illustrates a simplified example of a coronal view of a patient CT scan image 100. The patient body is illustrated by outline 110. An auto-generated contour has been generated for an organ in the head, for example the parotid gland, indicated generally at 120. The axial CT slices intersecting with this organ are indicated generally at 130, and have been numbered 1 to 13 in the illustrated example. Auto-generated contours (not shown) for slices 2 to 12 have been generated and form a delineation structure for the parotid gland 120. For example, an auto-generated contouring system implementing a delineation process comprising one or more of the auto-generated contouring approaches mentioned above, may have generated a set of auto-generated contours within the slices 130 intersecting the parotid gland 130 to form a delineation structure for the parotid gland 130 within the CT scan image 100. In a conventional contour editing system, a user (e.g. a clinician) is presented with the full set of auto-generated contours forming the delineation structure for the object of interest (i.e. the parotid gland 120 in the illustrated example). When presented with the full set of auto-generated contours making up the delineation structure, the typical resulting workflow comprises the user checking every contour within the full set of auto-generated contours (i.e. the auto-generated contour within every slice 130 intersecting the parotid gland 130), and manually editing or deleting and manually re-contouring each slice 130. As such, any time saving achieved by the auto-generated contouring process is effectively lost due to the subsequent manual editing/re-contouring that is performed.

According to some examples of the present invention, in order to change the workflow following the auto-generation of contours for objects within medical images, it is proposed to provide a system in which a subset of the set of auto-generated contours is determined based on one or more predefined criteria, and the determined subset of auto-generated contours is then identified, or otherwise made available to, a user for editing. The user is then able to manually edit the identified subset of auto-generated contours, and then use contour interpolation to 'fill in the gaps' between the (edited) contours within the determined subset. In this manner, the number of image slices for which contour editing is performed may be significantly reduced (e.g. from every slice intersecting the object of interest to only those corresponding to the determined subset of auto-generated contours).

For example, for the CT scan image illustrated in FIG. 1, based on, say, user-configuration a contour generation/editing system may be arranged to determine a subset of auto-generated contours for an object of interest by selecting the top and bottom slices comprising auto-generated contours for the object of interest, and every other slice there between. Thus, for the example illustrated in FIG. 1, the system may select slices 2, 4, 6, 8, 10 & 12 and define the subset of auto-generated contours as comprising the auto-generated contours for those selected slices.

Figure 2:
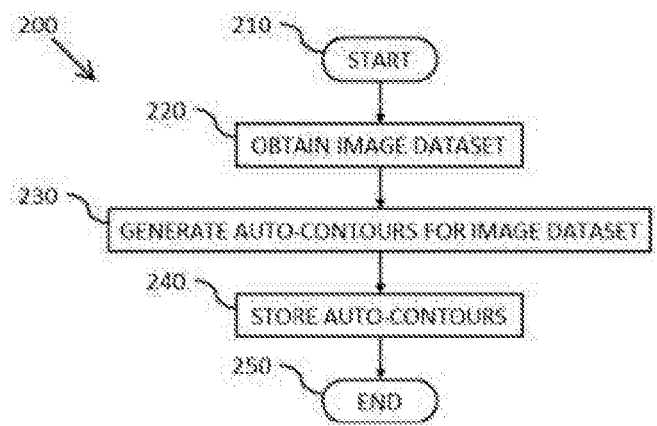
FIGS. 2 and 3 illustrate simplified flowcharts of an example of a method of delineating at least one object within a volumetric medical image.
Figure 3:
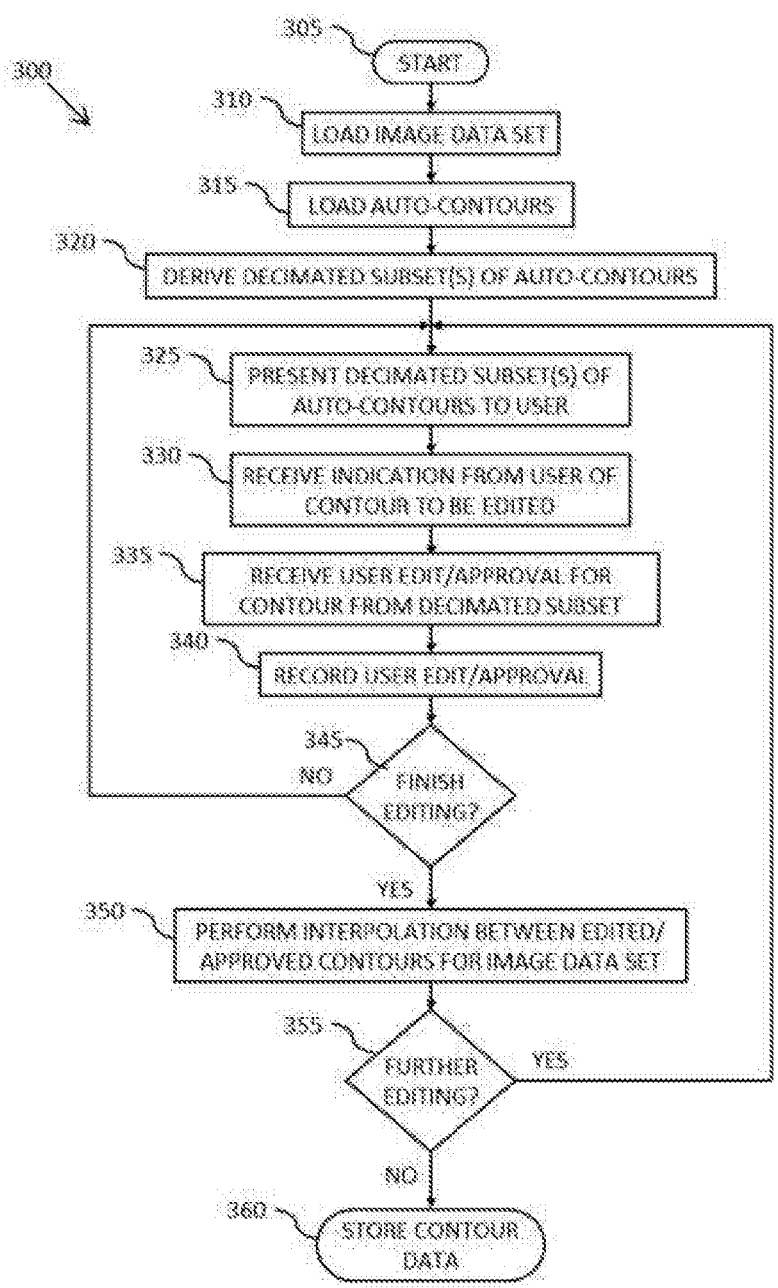

FIGS. 2 and 3 illustrate simplified flowcharts 200, 300 of an example of a method of delineating at least one object within a volumetric medical image.

Referring first to FIG. 2, there is illustrated a simplified flowchart 200 of a part of the method performed within, say, a medical image delineation (auto-generated contouring) system. This part of the method starts at 210, and moves on to 220 where an image dataset for a volumetric medical image is obtained. Such an image dataset may comprise a plurality of two dimensional (2D) image slices which when stacked together form a three-dimensional (3D) volumetric image, and may have been obtained by way of any suitable imaging modality such as, say, CT (computed tomography), PET (positron emission tomography), and MRI (magnetic resonance imaging), etc. An auto-generated contouring process is then performed on the volumetric medical image, at 230, to generate contours that delineate one or more objects within the volumetric medical image, for example one or more organs, tumours, etc. within the medical image. As such, auto-generated contour data for the volumetric medical image is generated defining a set of auto-generated contours for the, or each, object of interest within the volumetric medical image forming a delineation structure for the respective object. Typically, such a set of auto-generated contours forming a delineation structure for an object of interest comprises data defining a contour for each 2D image slice intersecting the object of interest. Such an auto-generated contouring process may comprise one or more of an atlas-based auto-generated contouring process, a segmentation-based auto-generated contouring process, and a model-based auto-generated contouring process. For the illustrated example of FIG. 2, the auto-generated contour data is then stored within one or more data storage devices at 240, from where it may subsequently be retrieved for editing etc., and this part of the method ends at 250.

Referring now to FIG. 3, there is illustrated a simplified flowchart 300 of a part of the method performed within, say, a medical image delineation (contour) editing system. This part of the method starts at 305, and moves on to step 310 where the image dataset for the volumetric medical image is loaded from a data storage device. Auto-generated contour data for at least one object within the volumetric medical image is also loaded from a data storage device, at step 315, the auto-generated contour data defining a set of auto-generated contours forming at least one delineation structure for the at least one object. The auto-generated contour data may be loaded from the same data storage device as the image dataset or from a different data storage device. Next, at step 320 one or more subset(s) of the loaded auto-generated contours is/are selected/derived for manual editing. In the illustrated example, a subset of auto-generated contours is selected by decimating the loaded set of auto-generated contours of the delineation structure for the (or each) object of interest within the volumetric medical image.

Such selection/decimation of the auto-generated contours of a delineation structure may be performed in any suitable manner. For example, such selection/decimation may be performed based on a user-configurable or predefined spacing between image slices corresponding to the derived subset of auto-generated contours.

Figure 4:
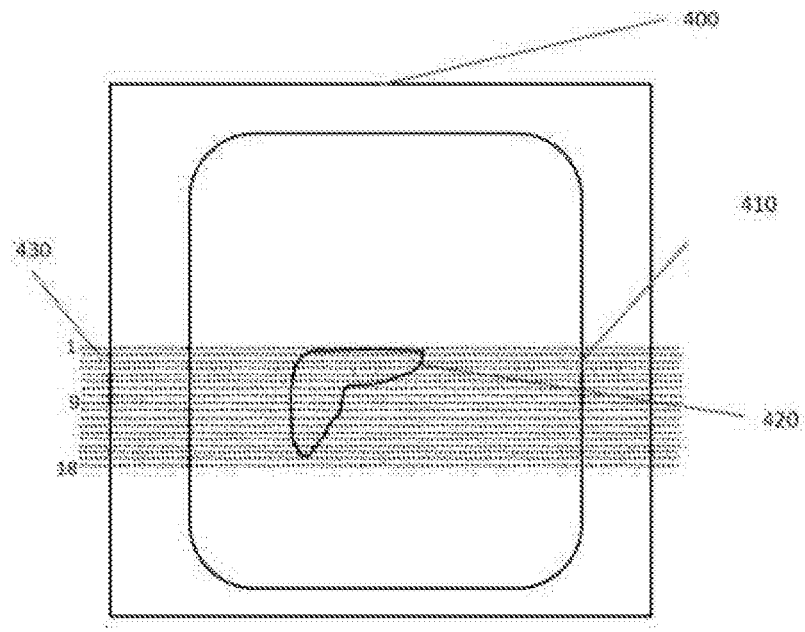
FIG. 4 illustrates a simplified representation of a CT scan image showing a coronal view of a patient

Additionally/alternatively, such selection/decimation of the auto-generated contours of a delineation structure may be performed based on, say, an assessment of out-of-plane curvature of auto-generated contours. Interpolation of contours (e.g. as described below) typically works best where the contours are consistent between slices. Therefore, acute out-of-plane curvature may require more contour slices to be defined than moderate out-of plane curvature prior to interpolation. FIG. 4 illustrates a simplified representation of a CT scan image 400 showing a coronal view of a patient 410. A delineation structure of the liver is shown at 420. Eighteen axial image slices are indicated general at 430. The delineation structure 420 intersects fifteen of the axial image slices, specifically slices 2 to 16. The out-of-plane curvature for the delineation structure 420 is high (acute) around the axial image slices 4, 7, 10, 12 and 15. As such, the set of auto-generated contours forming the delineation structure 420 may be decimated to comprise the auto-generated contours corresponding to the axial image slices 4, 7, 10, 12 and 15.

Additionally/alternatively, such selection/decimation of the auto-generated contours of a delineation structure may be performed based on, say, differences between contours corresponding to neighbouring image slices. Taking the example illustrated in FIG. 4, the auto-generated contours corresponding to axial image slices 2 and 16 may be taken as the end contours. The auto-generated contour corresponding to axial image slice 5 may be selected as sufficiently different from that of slice 2 to merit manual editing. The auto-generated contours corresponding to axial image slices 6 and 7 may also be selected as sufficiently different to those of their respective preceding axial image slices (5 and 6 respectively) to merit manual editing. The auto-generated contour corresponding to axial image slice 11 may then be selected as sufficiently different to that of axial image slice 7 to merit manual editing. Finally, auto-generated contours corresponding to axial image slices 13 & 15 may also be selected as sufficiently different to those of their respective preceding axial image slices (12 and 14 respectively) to merit manual editing.

Figure 5:
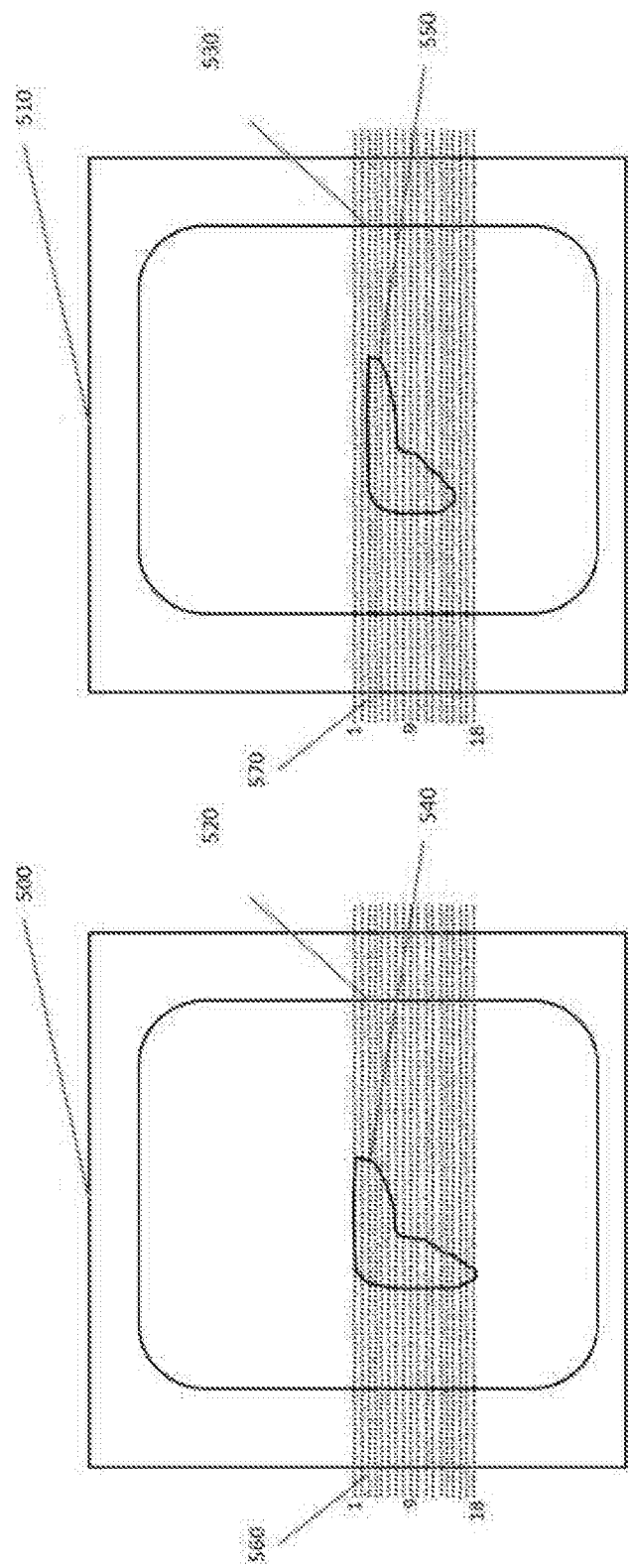
FIG. 5 illustrates a simplified representation of a CT scan image for a previous patient comprising a delineation structure of a liver such as may have been manually defined by a clinical expert and which may be used to provide an atlas.

Additionally/alternatively, such selection/decimation of the auto-generated contours of a delineation structure may be performed based on, say, prior definition on a model or atlas. The slices comprising auto-generated contours most appropriate for manual editing may be defined on an atlas or a model. This may be the atlas or model used to create the auto-generated contour, or may be an independent atlas or model. FIG. 5 illustrates a simplified representation of a CT scan image 500 showing a coronal view of a previous patient 520. A previously defined delineation structure of the liver is shown at 540, such as may have been manually defined by a clinical expert and which may be used to provide an atlas. The atlas structure 540 intersects eighteen axial image slices, slices 1 to 18 within the CT scan image 500. A clinical expert has defined slices 1, 4, 6, 7, 11 & 18 as corresponding to contours of the atlas structure 540 most suitable for manual editing. FIG. 5 also illustrates a simplified representation of a CT scan image 510 showing a coronal view of a current patient 530. A delineation structure of the liver is shown at 550. Eighteen axial image slices are indicated general at 530. The delineation structure 550 intersects thirteen of the axial image slices, specifically slices 3 to 15. Using deformable image registration, the atlas structure 540 may be mapped to the CT scan image 510 of the current patient 530. Using the same registration, the axial image slices within the CT scan image 510 for the current patient that best correspond to the defined slices 1, 4, 6, 7, 11 & 18 for the atlas CT scan image 500 may be determined, and selected/derived for manual editing.

Additionally/alternatively, such selection/decimation of the auto-generated contours of a delineation structure may be performed based on, say, learning based on previous editing. For example, a system may learn what slices are most suitable for editing based on the required user editing on previous cases. Such knowledge can be recorded and transferred to a current medical image in many different ways. For example the system may record image slices for which auto-generated contours are edited following auto-generation of contours from a particular atlas or model.

Figure 6:
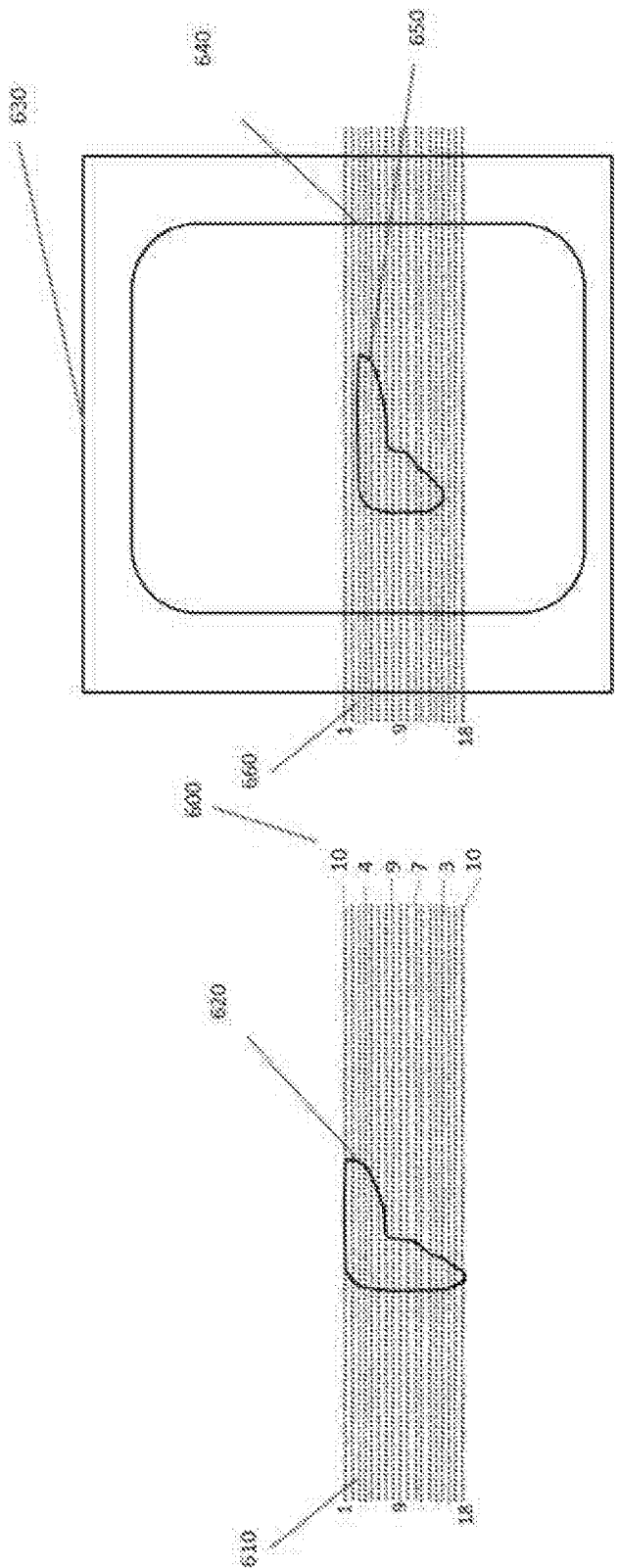
FIG. 6 illustrates an example of an atlas or model used for auto-generation of contours showing a coronal view of a previous patient.

Auto-generated contours corresponding to image slices that are frequently edited could then be selected by the system as most suitable for manual editing. For example, FIG. 6 illustrates an example of an atlas or model 620 used for auto-generation of contours. The atlas/model 620 is formed over 18 axial slices 610. A number of times auto-generated contours are edited for each slice following auto-generation of contours from the atlas/model 620 are recorded, as indicated generally at 600. FIG. 6 also illustrates a simplified representation of a CT scan image 630 showing a coronal view of a current patient 640. A delineation structure of the liver is shown at 650. Eighteen axial image slices are indicated general at 660. Axial image slices 660 of the current scan image 630 corresponding to those within the atlas/model 620 that are most frequently edited (e.g. those that have been edited more than a predefined number of times, or the n most edited slices) may be identified to a user for manual editing. For each auto-generated contour within the delineated structure 650 edited by a user, the respective number 600 for the corresponding slice within the atlas/model 620 may be incremented.

Additionally/alternatively, such selection/decimation of the auto-generated contours of a delineation structure may be performed based on, say, assessment of estimated contour accuracy. Such estimation of accuracy can be performed in many ways. Examples include but are not limited to:
- a comparison of the auto-generated contour to a shape-model to assess variation from a 'normal' shape;
- a comparison of region statistics calculated within or at the boundary of the auto-generated contour to the expected range for a particular organ;
- from the variation of multiple auto-generated contouring results such as the variation in results from a multi-atlas system prior to fusion; and/or
- a calculation of confidence measures during the auto-generated contouring process.

It will be appreciated that many other examples of selecting an appropriate subset of auto-generated contours exist and could be implemented by those skilled in the art given knowledge of this disclosure, and the above examples are not intended to be limiting.

Referring back to FIG. 3, having selected/derived one or more subset(s) of the loaded auto-generated contours for manual editing at step 320, the method moves on to step 325 where in the illustrated example of FIG. 3 the (or each) subset of auto-generated contours is presented to a user. For example, the volumetric medical image may be displayed to the user with only the selected subset(s) of auto-generated contours being displayed along with the image. Alternatively, the full set of auto-generated contours forming a complete delineation structure for the object of interest may be presented to the user within the displayed volumetric medical image, and the axial image slices comprising auto-generated contours within the selected subset(s) may be identified (e.g. highlighted or otherwise distinguished) to the user to allow the user to differentiate between auto-generated contours within the selected subset(s) and those not within the selected subset(s). In this manner, a user is readily able to identify the selected auto-generated contours for manual editing, and thus perform the manual editing of those auto-generated contours without the need for additional effort by the user to identify which auto-generated contours would be most suitable/appropriate for manual editing. Next, at step 330, an indication is received from the user of at least one contour to be edited. Such an indication may comprise, say, an indication of an image slice of the medical image and/or an indication of an object within the medical image. User feedback is then received for the indicated contour, at step 335. Such feedback may comprise, for example, approval of the (auto-generated) contour, modification of the contour; or replacement of the (auto-generated) contour with a user generated contour. The received user edit/approval is then recorded, at step 340, and the method moves on to step 345 where it is determined whether the user has finished editing (for example based on receipt of an indication from the user). If the user has not finished editing, the method loops back to step 325 where the (edited) subset of auto-generated contours is again presented to the user. In some examples, the auto-generated contours for which user feedback has been received may be indicated to the user to help the user identify which contours have already been edited/approved. Referring back to step 345, if it is determined that the user has finished editing, the method moves on to step 350, where a full set of contours forming a revised delineation structure for the object of interest(s) within the volumetric medical image based on an interpolation of the auto-generated contour(s) for which user feedback was received. Such interpolation may be implemented in any suitable manner, for example by way of known interpolation tools conventionally used as part of conventional manual contouring processes. Such interpolation may comprise, say, simple contour-based interpolation to more complex approaches considering the underlying image information. In most cases the resulting contours on the intermediate slices will require no editing. Next, at step 355, it is determined whether further editing is required, for example based on an indication from the user. If further editing is required, the method loops back to step 325. Conversely, if further editing is not required, the method ends at 360 with storing contour data defining the full set of contours forming the revised delineation structure for the object of interest(s) within the volumetric medical image within a data storage device.

Figure 7:
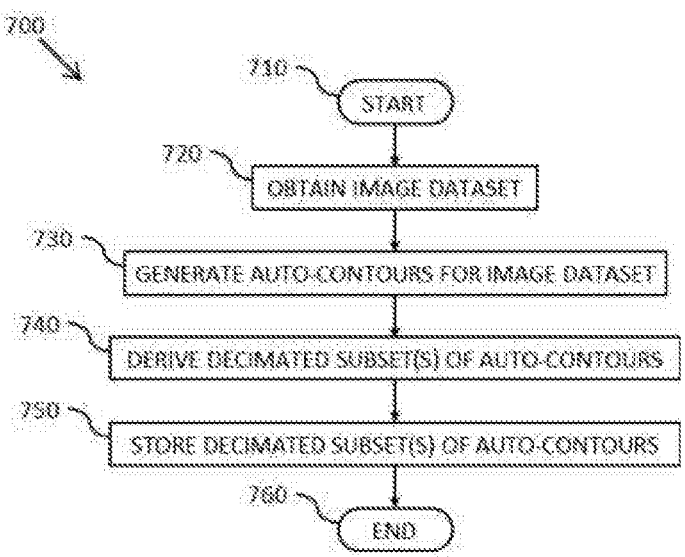
FIGS. 7 and 8 illustrate simplified flowcharts of an alternative example of a method of delineating at least one object within a volumetric medical image.
Figure 8:
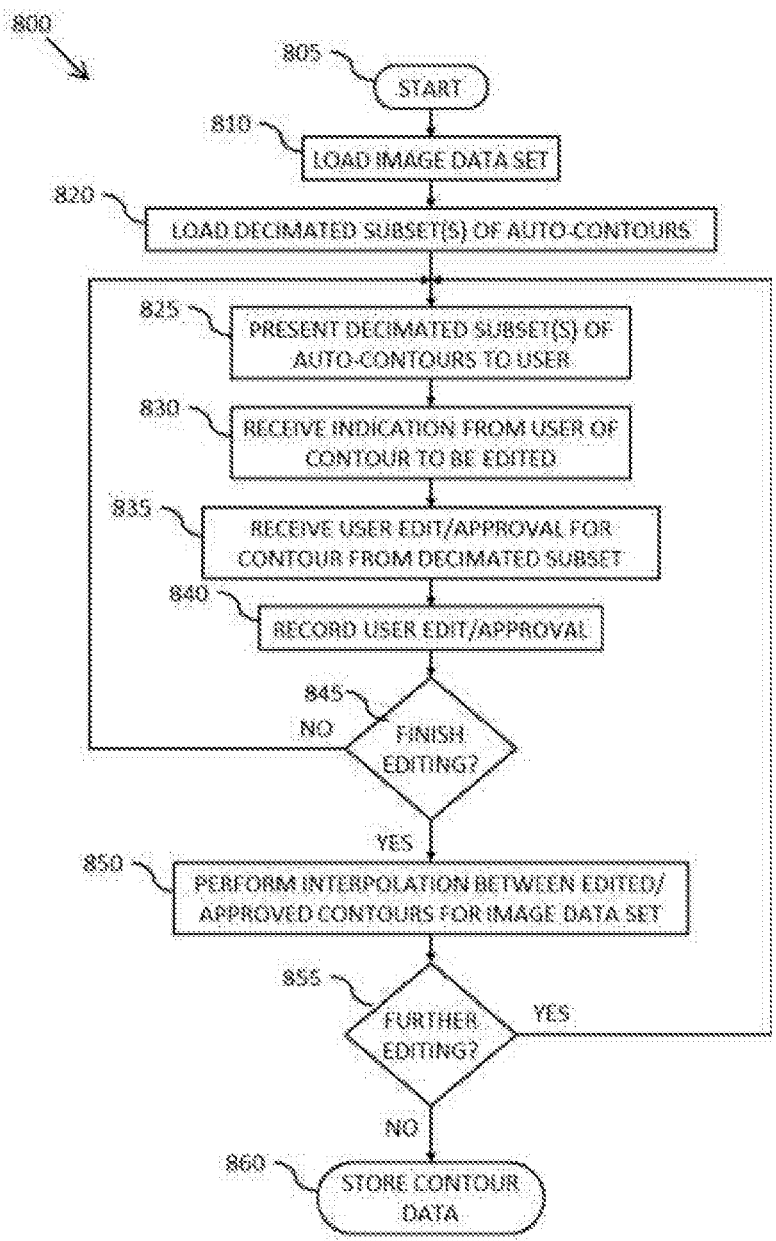

FIGS. 7 and 8 illustrate simplified flowcharts 700, 800 of an alternative example of a method of delineating at least one object within a volumetric medical image.

Referring first to FIG. 7, there is illustrated a simplified flowchart 700 of a part of the method performed within, say, a medical image delineation (auto-generated contouring) system. This part of the method starts at 710, and moves on to 720 where an image dataset for a volumetric medical image is obtained. As for the method of FIG. 2, such an image dataset may comprise a plurality of two dimensional (2D) image slices which when stacked together form a three-dimensional (3D) volumetric image, and may have been obtained by way of any suitable imaging modality such as, say, CT (computed tomography), PET (positron emission tomography), and MRI (magnetic resonance imaging), etc. An auto-generated contouring process is then performed on the volumetric medical image, at 730, to generate contours that delineate one or more objects within the volumetric medical image, for example one or more organs, tumours, etc. within the medical image. As such, auto-generated contour data for the volumetric medical image is generated defining a set of auto-generated contours for the, or each, object of interest within the volumetric medical image forming a delineation structure for the respective object. Such an auto-generated contouring process may comprise one or more of an atlas-based auto-generated contouring process, a segmentation-based auto-generated contouring process, and a model-based auto-generated contouring process. For the illustrated example of FIG. 7, the set of auto-generated contours is then decimated at step 740 to select/derive one or more subset(s) of the auto-generated contours of the delineation structure for the (or each) object of interest within the volumetric medical image for manual editing. As previously described with reference to the method of FIG. 3, such decimation of the auto-generated contours of a delineation structure may be performed in any suitable manner. For example, such decimation may be performed based on a user-configurable or predefined spacing between image slices corresponding to the derived subset of auto-generated contours. Additionally/alternatively, such decimation of the auto-generated contours of a delineation structure may be performed based on, say, an assessment of out-of-plane curvature of auto-generated contours. Additionally/alternatively, such decimation of the auto-generated contours of a delineation structure may be performed based on, say, differences between contours corresponding to neighbouring image slices. Additionally/alternatively, such decimation of the auto-generated contours of a delineation structure may be performed based on, say, prior definition on a model or atlas. Additionally/alternatively, such decimation of the auto-generated contours of a delineation structure may be performed based on, say, learning based on previous editing. Additionally/alternatively, such decimation of the auto-generated contours of a delineation structure may be performed based on, say, assessment of estimated contour accuracy. It will be appreciated that many other examples of selecting an appropriate subset of auto-generated contours exist and could be implemented by those skilled in the art given knowledge of this disclosure, and the above examples are not intended to be limiting. The auto-generated contour data for the (or each) derived subset of auto-generated contours is then stored within one or more data storage devices at 750, from where it may subsequently be retrieved for editing etc., and this part of the method ends at 760.

Referring now to FIG. 8, there is illustrated a simplified flowchart 800 of a part of the method performed within, say, a medical image delineation (contour) editing system. This part of the method starts at 805, and moves on to step 810 where the image dataset for the volumetric medical image is loaded from a data storage device. Auto-generated contour data for at least one object within the volumetric medical image is also loaded from a data storage device, at step 820, the auto-generated contour data defining a pre-decimated subset of auto-generated contours forming at least one delineation structure for the at least one object. The auto-generated contour data may be loaded from the same data storage device as the image dataset or from a different data storage device. Next, at step 825, the (or each) subset of auto-generated contours is presented to a user. For example, the volumetric medical image may be displayed to the user with only the selected subset(s) of auto-generated contours being displayed along with the image. Alternatively, the full set of auto-generated contours forming a complete delineation structure for the object of interest may be presented to the user within the displayed volumetric medical image, and the axial image slices comprising auto-generated contours within the selected subset(s) may be identified (e.g. highlighted or otherwise distinguished) to the user to allow the user to differentiate between auto-generated contours within the selected subset(s) and those not within the selected subset(s). In this manner, a user is readily able to identify the selected auto-generated contours for manual editing, and thus perform the manual editing of those auto-generated contours without the need for additional effort by the user to identify which auto-generated contours would be most suitable/appropriate for manual editing. Next, at step 830, an indication is received from the user of at least one contour to be edited. Such an indication may comprise, say, an indication of an image slice of the medical image and/or an indication of an object within the medical image. User feedback is then received for the indicated contour, at step 835. Such feedback may comprise, for example, approval of the (auto-generated) contour, modification of the contour; or replacement of the (auto-generated) contour with a user generated contour. The received user edit/approval is then recorded, at step 840, and the method moves on to step 845 where it is determined whether the user has finished editing (for example based on receipt of an indication from the user). If the user has not finished editing, the method loops back to step 825 where the (edited) subset of auto-generated contours is again presented to the user. In some examples, the auto-generated contours for which user feedback has been received may be indicated to the user to help the user identify which contours have already been edited/approved. Referring back to step 845, if it is determined that the user has finished editing, the method moves on to step 850, where a full set of contours forming a revised delineation structure for the object of interest(s) within the volumetric medical image based on an interpolation of the auto-generated contour(s) for which user feedback was received. Such interpolation may be implemented in any suitable manner, for example by way of known interpolation tools conventionally used as part of conventional manual contouring processes. Such interpolation may comprise, say, simple contour-based interpolation to more complex approaches considering the underlying image information. In most cases the resulting contours on the intermediate slices will require no editing. Next, at step 855, it is determined whether further editing is required, for example based on an indication from the user. If further editing is required, the method loops back to step 825. Conversely, if further editing is not required, the method ends at 860 with storing contour data defining the full set of contours forming the revised delineation structure for the object of interest(s) within the volumetric medical image within a data storage device.

As will be appreciated by a person skilled in the art, by selecting a subset of auto-generated contours for manual editing, and identifying the selected subset of auto-generated contours to a user, the present invention addresses the problem of the time taken to edit contours produced from auto-contouring solutions, thus enabling bottleneck in clinical practice due to radiotherapy contouring to be significantly reduced. In particular, the present invention helps to overcome the problem of the clinician, when presented with a full set of auto-generated contours, checking every auto-generated contour editing each contour manually, or manually delete them if they are consider too inaccurate and then manually re-creating contours. The present invention overcomes this problem by adapting the process of auto-contouring to reflect clinical practice, by removing the need for user editing of every auto-generated contour within a delineation structure.

Thus, examples of the present invention enable auto-contouring to be used more efficiently within an existing clinical workflow, and may be implemented using existing contour editing tools, reducing the time required for editing of auto-contours.

Figure 9:
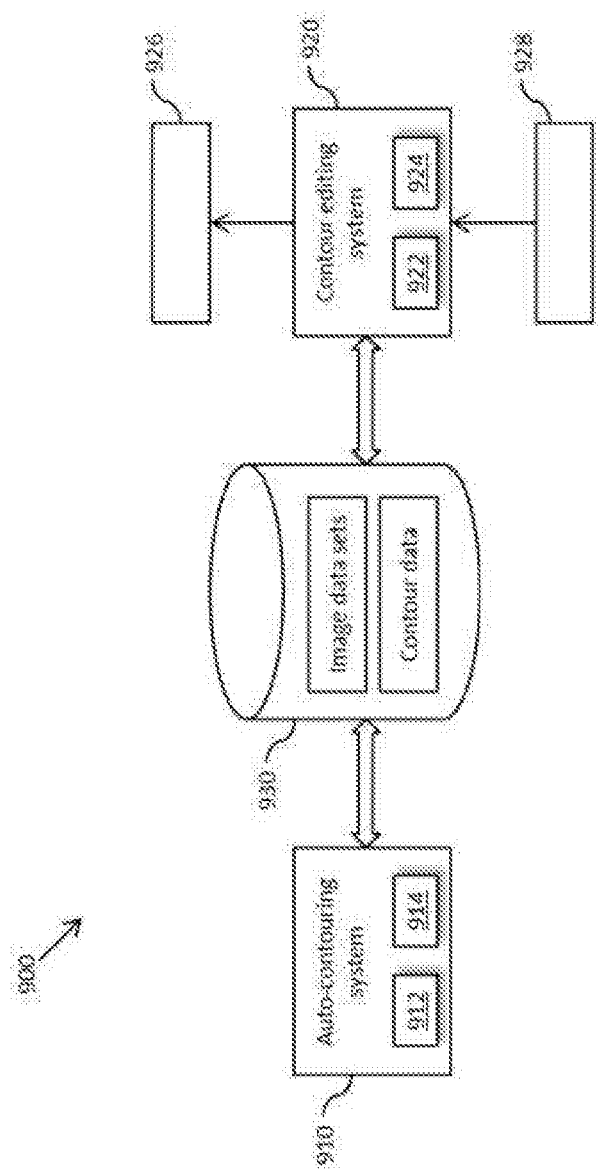
FIG. 9 illustrates a simplified block diagram of an example of a medical image delineation system.

Referring now to FIG. 9, there is illustrated a simplified block diagram of an example of a medical image delineation system 900. For the example illustrated in FIG. 9, the medical image delineation system 900 comprises an auto-contouring subsystem 910 comprising at least one signal processor component 912 arranged to execute computer program code, such as may be stored within a memory element 914 of the auto-contouring subsystem 910. In particular, the auto-contouring subsystem 910 is arranged to execute computer program code operable for performing at least a part of a method of delineating at least one object within a volumetric medical image by auto-generating contours forming a delineation structure for the at least one object. For example, the auto-contouring subsystem 910 may be arranged to execute computer program code operable for performing the method of FIG. 2 and/or FIG. 7. The auto-contouring subsystem 910 is operably coupled to one or more data storage devices, such as the data storage device 930 illustrated in FIG. 9, and is arranged to store auto-generated contour data therein.

The medical image delineation system 900 further comprises a contour editing subsystem 920 comprising at least one signal processor component 922 arranged to execute computer program code, such as may be stored within a memory element 924 of the contour editing subsystem 920. In particular, the contour editing subsystem 920 is arranged to execute computer program code operable for performing at least a part of a method of delineating at least one object within a volumetric medical image by enabling a user to edit auto-generated contours forming a delineation structure for the at least one object. For example, the contour editing subsystem 920 may be arranged to execute computer program code operable for performing the method of FIG. 3 and/or FIG. 8. The contour editing subsystem 920 is operably coupled to one or more data storage devices, such as the data storage device 930 illustrated in FIG. 9, and is arranged to load auto-generated contour data therefrom, and to store edited contour data therein. The contour editing subsystem 920 is operably coupled to a display component 926 controllable by the signal processor component 922 to display to a user medical images and contours corresponding to such medical images. The contour editing subsystem 920 is further operably coupled to an input component 928 arranged to receive user feedback. Thus, in this manner the signal processor component 922 of the contour editing subsystem 920 may be arranged to load auto-generated contour data defining a pre-decimated subset of auto-generated contours pre-selected for manual editing from the data storage device 930, cause the display component 926 to present at least the pre-decimated subset of auto-generated contours to a user, receive from the input component 928 user feedback for one or more of the auto-generated contour(s), derive a full set of contours forming at least one revised delineation structure for the at least one object based at least partly on an interpolation of the at least one auto-generated contour for which user feedback was received, and store contour data defining the derived full set of contours forming at least one revised delineation structure for the at least one object within the data storage device 930.

The memory elements 914, 924 of the auto-contouring subsystem 910 and the contour editing subsystem 920 may comprise non-transitory computer program products comprising at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

Figure 10:
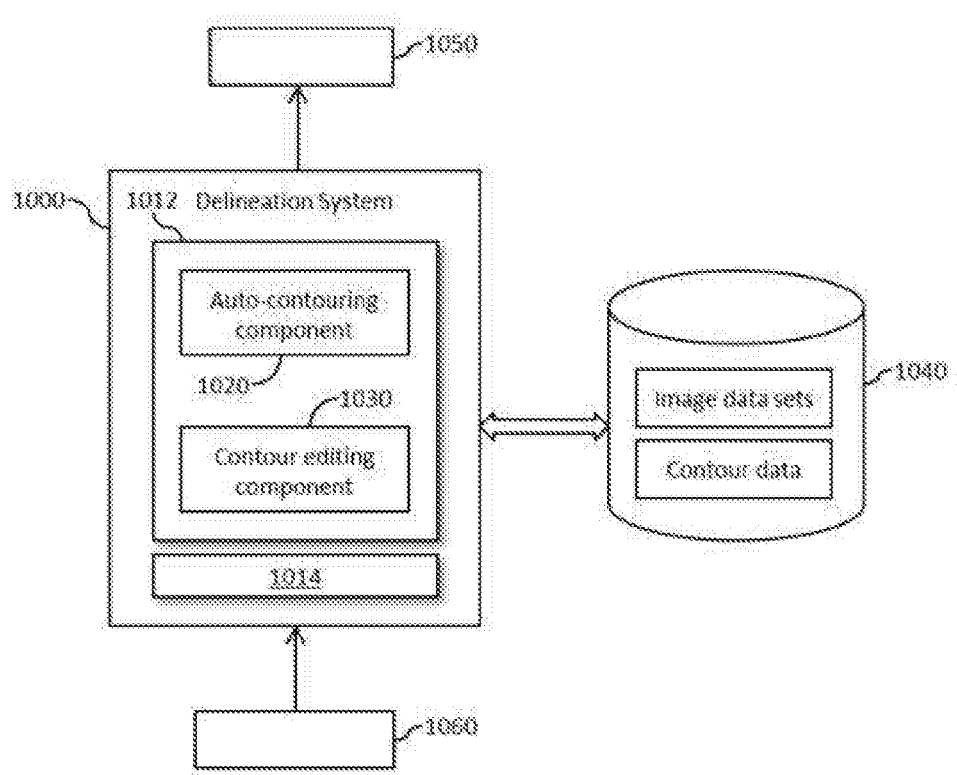
FIG. 10 illustrates a simplified block diagram of an alternative example of a medical image delineation system.

Referring now to FIG. 10, there is illustrated a simplified block diagram of an alternative example of a medical image delineation system 1000. In the example illustrated in FIG. 10, the medical image delineation system 1000 comprises a combined system arranged to perform both the auto-generation of contours and the subsequent editing of auto-generated contours. The medical image delineation system 1000 comprises a signal processor component 1012 arranged to execute computer program code, such as may be stored within a memory element 1014 of the medical image delineation system 1000. In particular, the medical image delineation system 1000 is arranged to execute computer program code operable for performing a method of delineating at least one object within a volumetric medical image. For example, the medical image delineation system 1000 may be arranged to execute a first computer program code component 1020 operable for auto-generating contours forming a delineation structure for objects within volumetric medical images, such as the method of FIG. 2 and/or FIG. 7. The medical image delineation system 1000 may be further arranged to execute a further computer program code component 1030 operable for enabling a user to edit auto-generated contours forming a delineation structure for the at least one object, such as the method of FIG. 3 and/or FIG. 8.

The medical image delineation system 1000 is operably coupled to one or more data storage devices, such as the data storage device 1040 illustrated in FIG. 10, and is arranged to store contour data therein. The medical image delineation system 1000 is operably coupled to a display component 1050 controllable by the signal processor component 1012 to display to a user medical images and contours corresponding to such medical images. The medical image delineation system 1000 is further operably coupled to an input component 1060 arranged to receive user feedback. Thus, in this manner the signal processor component 1012 of the medical image delineation system 1000 may be arranged to generate auto-generated contour data defining a pre-decimated subset of auto-generated contours pre-selected for manual editing, cause the display component 1050 to present at least the pre-decimated subset of auto-generated contours to a user, receive from the input component 1060 user feedback for one or more of the auto-generated contour(s), derive a full set of contours forming at least one revised delineation structure for the at least one object based at least partly on an interpolation of the at least one auto-generated contour for which user feedback was received, and store contour data defining the derived full set of contours forming at least one revised delineation structure for the at least one object within the data storage device 1040.

The memory element 1014 of the medical image delineation system 1000 may comprise non-transitory computer program products comprising at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

As described above, the invention may be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a tangible and non-transitory computer readable storage medium or transmitted to the computer system via a computer readable transmission medium. All or some of the computer program may be provided on computer readable media permanently, removably or remotely coupled to an information processing system. The tangible and non-transitory computer readable media may include, for example and without limitation, any number of the following: magnetic storage media including disk and tape storage media; optical storage media such as compact disk media (e.g., CD-ROM, CD-R, etc.) and digital video disk storage media; non-volatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

We claim:

1. A method of delineating an object within a volumetric medical image, the method comprising:
    obtaining auto-generated contour data for the object within the volumetric medical image, the auto-generated contour data defining a set of auto-generated contours forming at least one volumetric delineation structure for the object;
    selecting, from the set of auto-generated contours, a subset of auto-generated contours for manual editing;
    wherein selecting the subset of auto-generated contours for manual editing is based at least partly on at least one from a group of:
        a user-configurable spacing between image slices corresponding to the derived subset of auto-generated contours;
        a predefined spacing between image slices corresponding to the derived subset of auto-generated contours;
        an assessment of out-of-plane curvature of auto-generated contours;

differences between contours corresponding to neighbouring image slices;
prior definition on a model or atlas;
learning based on previous editing; and
assessment of estimated contour accuracy,
presenting the subset of auto-generated contours to a user;
receiving user feedback for a plurality of auto-generated contours within the subset of auto-generated contours;
deriving a full set of contours forming a revised volumetric delineation structure for the object, based at least partly on an interpolation of the auto-generated contours for which user feedback was received; and
storing contour data defining the derived full set of contours forming the revised volumetric delineation structure for the object within at least one data storage device.

2. The method of claim 1, wherein the method further comprises receiving at least one indication from the user of contours to be edited, and receiving user feedback for the contours to be edited.

3. The method of claim 2, wherein the method comprises the at least one indication received from the user of the contours to be edited comprising at least one of:
an indication of an image slice of the medical image; and
an indication of an object within the medical image.

4. The method of claim 1, wherein the method comprises receiving the user feedback for at least one auto-generated contour comprising one of:
approval of the at least one auto-generated contour;
modification of the at least one auto-generated contour; and
replacement of the at least one auto-generated contour with a user generated contour.

5. The method of claim 1, wherein the method further comprises indicating, to the user, for which of the auto-generated contours user feedback has been received.

6. The method of claim 1, wherein obtaining the auto-generated contour data defining the subset of auto-generated contours for manual editing comprises:
obtaining auto-generated contour data for the object within the volumetric medical image, the auto-generated contour data defining the set of auto-generated contours forming the at least one volumetric delineation structure for the object; and
selecting the subset of auto-generated contours for manual editing from the set of auto-generated contours.

7. The method of claim 6, wherein the method comprises presenting the obtained set of auto-generated contours forming a delineation structure to the user, and identifying to the user image slices of the volumetric medical image comprising auto-generated contours within the subset of auto-generated contours selected for manual editing.

8. The method of claim 6, wherein the method further comprises storing in a data storage device, the auto-generated contour data defining the selected subset of auto-generated contours.

9. The method of claim 6, wherein the method comprises decimating the obtained set of auto-generated contours to derive the subset of auto-generated contours for manual editing.

10. The method of claim 6, wherein the method comprises generating the auto-generated contour data defining the set of auto-generated contours forming at least one delineation structure for the object based at least partly on at least one of:
an atlas-based auto-generated contouring process;
a segmentation-based auto-generated contouring process; and
a model-based auto-generated contouring process.

11. The method of claim 6, wherein the method comprises loading the auto-generated contour data defining the set of auto-generated contours forming at least one delineation structure for the object from a data storage device.

12. The method of claim 1, wherein obtaining the auto-generated contour data defining the subset of auto-generated contours for manual editing comprises loading auto-generated contour data defining a pre-decimated subset of auto-generated contours pre-selected for manual editing.

13. The method of claim 12, wherein the method comprises indicating, to the user, image slices of the volumetric medical image comprising auto-generated contours within the pre-decimated subset of auto-generated contours pre-selected for manual editing.

14. The method of claim 1, wherein the method is executed using a non-transitory computer program product having executable program code stored therein for delineating at least one object within a volumetric medical image.

15. The method of claim 14, wherein the non-transitory computer program product comprises at least one from a group including: a hard disk, a CD-ROM, an optical storage device, a magnetic storage device, a Read Only Memory, ROM, a Programmable Read Only Memory, PROM, an Erasable Programmable Read Only Memory, EPROM, an Electrically Erasable Programmable Read Only Memory, EEPROM, and a Flash memory.

16. A medical image delineation system comprising at least one signal processor component; wherein the at least one signal processor component is arranged to:
obtain auto-generated contour data for an object within a volumetric medical image, the auto-generated contour data defining a set of auto-generated contours forming at least one volumetric delineation structure for the object; and
select, from the set of auto-generated contours, a subset of auto-generated contours for manual editing;
wherein selecting the subset of auto-generated contours for manual editing is based at least partly on at least one from a group of:
a user-configurable spacing between image slices corresponding to the derived subset of auto-generated contours;
a predefined spacing between image slices corresponding to the derived subset of auto-generated contours;
an assessment of out-of-plane curvature of auto-generated contours;
differences between contours corresponding to neighbouring image slices:
prior definition on a model or atlas;
learning based on previous editing; and
assessment of estimated contour accuracy,
cause at least one display component to present the subset of auto-generated contours to a user;
receive, from at least one input component, user feedback for a plurality of auto-generated contours within the subset of auto-generated contours;
derive a full set of contours forming a revised volumetric delineation structure for the object, based at least partly on an interpolation of the auto-generated contours for which user feedback was received; and
store contour data defining the derived full set of contours forming the revised volumetric delineation structure for the object within at least one data storage device.

17. The medical image delineation system of claim 16, wherein the at least one signal processor component is further arranged to store, in a data storage device, auto-generated contour data defining the selected subset of auto-generated contours.

18. The medical image delineation system of claim 16, wherein the at least one signal processor component is arranged to:
   obtain auto-generated contour data for the object within the volumetric medical image, the auto-generated contour data defining the set of auto-generated contours forming the at least one volumetric delineation structure for the object; and
   select the subset of auto-generated contours for manual editing from the set of auto-generated contours.

19. The medical image delineation system of claim 16, wherein the at least one signal processor component is arranged to load auto-generated contour data defining a pre-decimated subset of auto-generated contours, pre-selected for manual editing.

\* \* \* \* \*